US007005829B2

(12) United States Patent
Schnetzka

(10) Patent No.: US 7,005,829 B2
(45) Date of Patent: Feb. 28, 2006

(54) SYSTEM FOR PRECHARGING A DC LINK IN A VARIABLE SPEED DRIVE

(75) Inventor: Harold Robert Schnetzka, York, PA (US)

(73) Assignee: York International Corp., York, PA (US)

( * ) Notice: Subject to any disclaimer, the term of this patent is extended or adjusted under 35 U.S.C. 154(b) by 0 days.

(21) Appl. No.: 11/068,999

(22) Filed: Mar. 1, 2005

(65) Prior Publication Data

US 2005/0122752 A1  Jun. 9, 2005

(51) Int. Cl.
*H02P 7/42*       (2006.01)
(52) U.S. Cl. .................... 318/801; 318/801; 363/76; 363/77; 363/84
(58) Field of Classification Search ............. 318/801; 363/76, 77, 84
See application file for complete search history.

(56) References Cited

U.S. PATENT DOCUMENTS

| | | | | |
|---|---|---|---|---|
| 3,621,366 | A | * | 11/1971 | Duff et al. .................. 363/124 |
| 4,697,131 | A | * | 9/1987 | Schauder et al. ........... 318/762 |
| 4,761,726 | A | | 8/1988 | Brown ........................ 363/51 |
| 4,864,483 | A | * | 9/1989 | Divan ......................... 363/37 |
| 4,959,602 | A | * | 9/1990 | Scott et al. ................. 318/803 |
| 5,038,267 | A | * | 8/1991 | De Doncker et al. ......... 363/89 |
| 5,483,142 | A | * | 1/1996 | Skibinski et al. ............ 320/166 |
| 5,570,279 | A | | 10/1996 | Venkataramanan ......... 363/127 |
| 5,625,549 | A | | 4/1997 | Horvat ....................... 363/132 |
| 5,757,599 | A | | 5/1998 | Crane ......................... 361/56 |
| 5,889,667 | A | | 3/1999 | Bernet ........................ 363/127 |
| 5,909,367 | A | * | 6/1999 | Change ...................... 363/163 |
| 6,163,472 | A | | 12/2000 | Colby ......................... 363/127 |
| 6,407,937 | B1 | * | 6/2002 | Bruckmann et al. ...... 363/56.05 |
| 6,507,503 | B1 | | 1/2003 | Norrga ........................ 363/17 |
| 6,566,764 | B1 | * | 5/2003 | Rebsdorf et al. ............. 290/44 |
| 6,603,675 | B1 | | 8/2003 | Norrga ........................ 363/32 |
| 6,625,046 | B1 | | 9/2003 | Geissler ...................... 363/89 |
| 6,657,874 | B1 | | 12/2003 | Yu ............................. 363/50 |
| 6,704,182 | B1 | * | 3/2004 | Bruckmann et al. ........ 361/91.1 |
| 2002/0176261 | A1 | | 11/2002 | Norrga ........................ 363/17 |
| 2003/0133317 | A1 | | 7/2003 | Norrga ........................ 363/127 |
| 2003/0168919 | A1 | | 9/2003 | Friedrichs et al. ........... 307/113 |
| 2003/0231518 | A1 | | 12/2003 | Peng ........................... 363/98 |

(Continued)

OTHER PUBLICATIONS

Silicon Carbide npnp Thyristors, John H. Glenn Research Center, Cleveland, Ohio, downloaded from http://www.nasatech.com/Briefs/Dec00/LEW16750.html on Jan. 20, 2004, 3 pages.

(Continued)

*Primary Examiner*—Rita Leykin
(74) *Attorney, Agent, or Firm*—McNees Wallace & Nurick LLC

(57) ABSTRACT

A variable speed drive with a converter that is controllable to precharge a DC link is provided. The variable speed drive also includes an inverter. The converter converts a fixed line frequency, fixed line voltage AC power from an AC power source into DC power. The DC link filters the DC power from the converter. Finally, the inverter is connected in parallel with the DC link and converts the DC power from the DC link into a variable frequency, variable voltage AC power. The converter includes a plurality of pairs of power switches, wherein each pair of power switches includes a reverse blocking power switch connected in anti-parallel to another reverse blocking power switch.

1 Claim, 7 Drawing Sheets

U.S. PATENT DOCUMENTS

2004/0008005 A1   1/2004   Sakai et al. .................. 318/801
2004/0012986 A1   1/2004   Riggio et al. .................. 363/26
2005/0190511 A1*  9/2005   Crane et al. .................. 361/23

OTHER PUBLICATIONS

IGBT with Reverse Blocking Capability, IXYS Semiconductor GmbH, 2003, pp. 1-2.

Ahmed Elasser and T. Paul Chow, Silicon Carbide Benefits and Advantages for Power Electronics Circuits and Systems, Proceedings of the IEEE, vol. 90, No. 6, Jun. 2002, pp. 969-986.

M. Takei, T. Naito and K. Ueno, The Reverse Blocking IGBT for Matrix Converter with Ultra-Thin Wafer Technology, 4 pages.

* cited by examiner

SYSTEM FOR PRECHARGING A DC LINK IN A VARIABLE SPEED DRIVE

BACKGROUND OF THE INVENTION

The present invention relates generally to variable speed drives. More specifically, the present invention relates to a system for precharging the DC link in a variable speed drive using insulated gate bipolar transistors in the rectifier or converter.

A variable speed drive (VSD) for heating, ventilation, air-conditioning and refrigeration (HVAC&R) applications typically includes a rectifier or converter, a DC link, and an inverter. The rectifier or converter converts the fixed line frequency, fixed line voltage AC power from an AC power source into DC power. The DC link filters the DC power from the converter and typically contains a large amount of electrical capacitance. Finally, the inverter is connected in parallel with the DC link and converts the DC power from the DC link into a variable frequency, variable voltage AC power. When electric power is applied to the VSD, the voltage across the DC link capacitors, referred to as the DC link voltage, rises from zero to a rated value, typically around 600 V. If this rise of the DC link voltage were left to occur naturally, it would happen very quickly by drawing very large electric currents from the input power lines, through the rectifier, and into the DC link capacitors. This large current, referred to as an inrush current, can be damaging to the components of the VSD. Thus, to avoid damage to the VSD components, the rise of the DC link voltage from 0 V to the rated voltage has to be accomplished in some controlled manner. This controlled raising of the DC link voltage is referred to as a DC link precharge operation.

Most VSDs accomplish a DC link precharge by two different methods. The first method employs precharge resistors and contactors connected between the input power line and the rectifier. The second method employs a rectifier consisting (at least partially) of thyristors, also called silicon controlled rectifiers, or SCRs.

In the first method, a precharge contactor is used to connect precharge resistors between the input power line and the rectifier or, sometimes, between the input power line and the DC link. These precharge resistors limit the inrush current to a manageable level. After the precharge is completed, the precharge resistors are excluded from the circuit by opening the precharge contactor, and the input power line is connected directly to the rectifier by closing another contactor, referred to as the supply contactor. The supply contactor remains closed during the operation of the system. This method is well suited for VSDs in which the rectifier is a simple diode rectifier, which offers no means for controlling the inrush current. The main disadvantage of this method is in the cost and size of its components, in particular of the supply contactor, which can negatively impact the cost and size of the entire VSD.

In the second method, the rectifier itself is used to accomplish precharge. The rectifier in this case has at least one SCR in each phase. SCRs are power semiconductors whose current conduction can be electronically controlled. The conduction of the rectifier's SCRs is controlled so as to let only small pulses of inrush current flow during precharge. After the precharge is completed, the rectifier's SCRs are controlled to conduct at all times, i.e., the rectifier after the precharge acts as if it were a diode rectifier.

The two precharge methods described above are applicable to VSDs whose rectifiers are made up of diodes and/or SCRs. However, there are VSDs with rectifiers or converters that do not use diodes or SCRs, but in fact, use insulated gate bipolar transistors (IGBTs) or other types of power switches or transistors. The IGBTs are usually packaged in modules and it is common for one module to include six IGBTs, which would be adequate for a three-phase rectifier. It is noted that the IGBT module can also be used for the inverter of the VSD. The typical IGBT module includes a diode for every IGBT present in the IGBT module, i.e., there would be six diodes in an IGBT module with six IGBTs. These diodes are commonly referred to, and connected, as anti-parallel diodes and are used to conduct current after an IGBT is turned off when the VSD operates in pulse width modulating (PWM) mode. The six anti-parallel diodes in the IGBT module can be considered to form a three-phase diode rectifier that is embedded within the IGBT module.

The embedded diode rectifier presents a problem for the precharge of VSDs that use IGBT modules because the first precharge method (precharge and supply contactors and resistors) described above must be used to precharge the DC link. This places additional cost and size burden on VSDs having IGBT modules for the rectifier or converter.

Therefore, what is needed is a system for precharging the DC link of a VSD having an IGBT-based rectifier or converter that does not require precharge and supply contactors and resistors.

SUMMARY OF THE INVENTION

One embodiment of the present invention is directed to a variable speed drive including an inverter module, a DC link and a converter module. The inverter module can convert a DC voltage to an AC voltage to power a motor. The DC link can filter and store energy and is electrically connected in parallel to the inverter module. The converter module can convert an AC voltage to a DC voltage and is electrically connected in parallel to the DC link and is electrically connected to an AC power source. The converter module includes a plurality of pairs of power switches, wherein each pair of power switches includes an insulated gate bipolar transistor connected to an anti-parallel diode and a reverse blocking insulated gate bipolar transistor connected to an anti-parallel reverse blocking insulated gate bipolar transistor. The plurality of pairs of power switches in the converter module are controllable to precharge the DC link.

One advantage of the present invention is that it is small and compact and can thereby reduce the size of the variable speed drive.

Another advantage of the present invention is that it reduces the cost of the variable speed drive by eliminating the need for expensive parts.

Still another advantage of the present invention is that it increases the reliability of the variable speed drive by eliminating electromechanical parts subject to routine wear and tear.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1A:
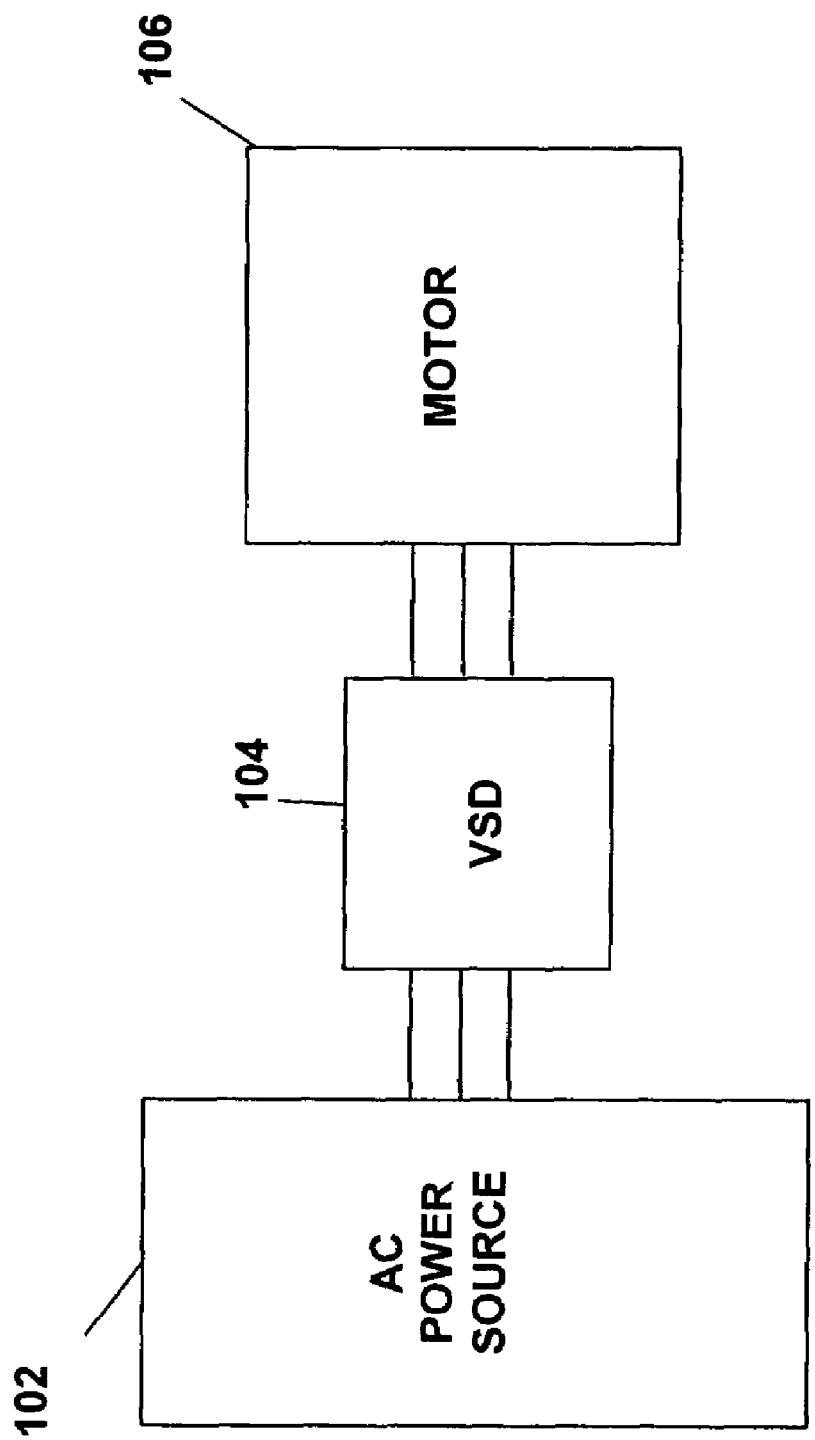
FIGS. 1A and 1B illustrate schematically general system configurations of the present invention.
Figure 1B:
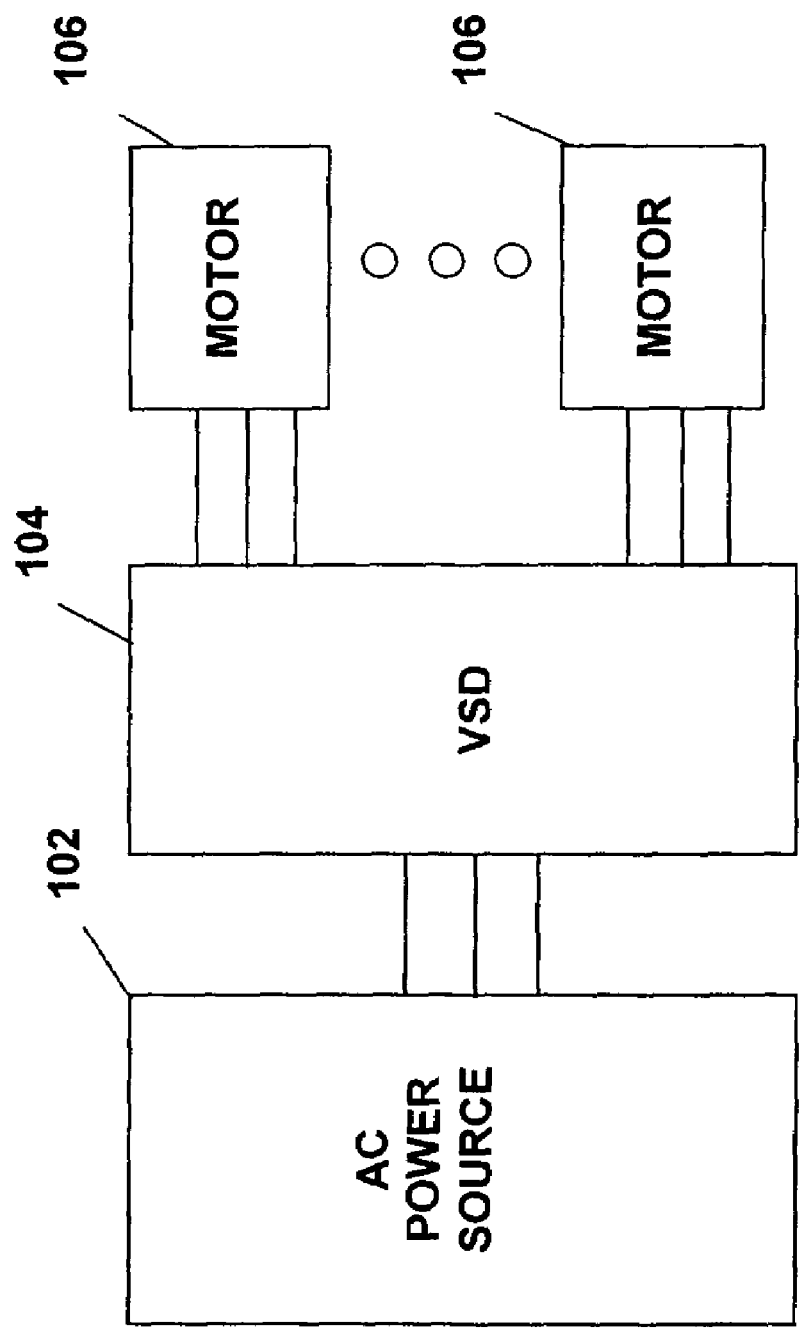

FIGS. 1A and 1B illustrate generally system configurations of the present invention. An AC power source 102 supplies a variable speed drive (VSD) 104, which powers a motor 106 (see FIG. 1A) or motors 106 (see FIG. 1B). The motor(s) 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V, at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to the motor(s) 106 at a desired voltage and desired frequency, both of which can be varied to satisfy particular requirements. Preferably, the VSD 104 can provide AC power to the motor(s) 106 having higher voltages and frequencies and lower voltages and frequencies than the rated voltage and frequency of the motor(s) 106. In another embodiment, the VSD 104 may again provide higher and lower frequencies but only the same or lower voltages than the rated voltage and frequency of the motor(s) 106. The motor(s) 106 is preferably an induction motor, but can include any type of motor that is capable of being operated at variable speeds. The induction motor can have any suitable pole arrangement including two poles, four poles or six poles.

Figure 2A:
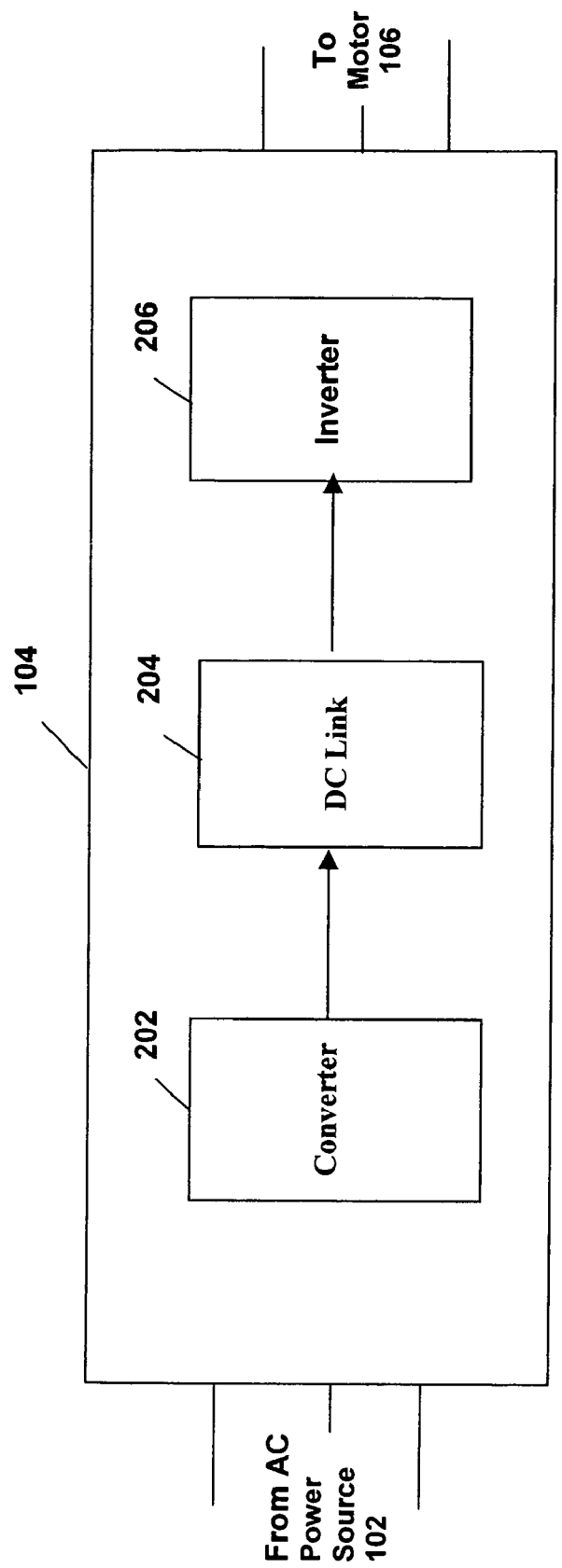
FIGS. 2A and 2B illustrate schematically embodiments of variable speed drives of the present invention.
Figure 2B:
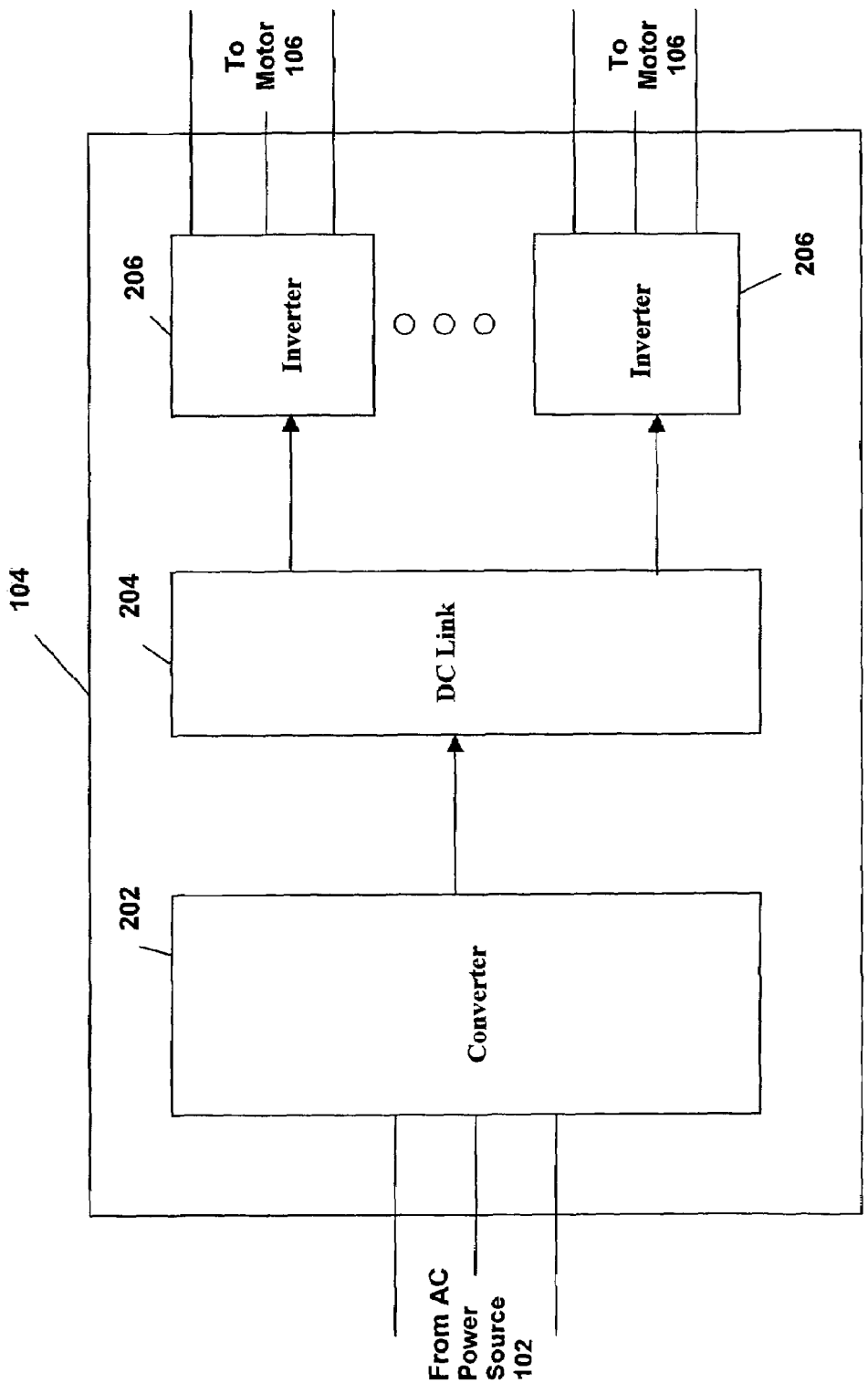

FIGS. 2A and 2B illustrate different embodiments of the VSD 104 of the present invention. The VSD 104 can have three stages: a converter stage 202, a DC link stage 204 and an output stage having one inverter 206 (see FIG. 2A) or a plurality of inverters 206 (see FIG. 2B). The converter 202 converts the fixed line frequency, fixed line voltage AC power from the AC power source 102 into DC power. The DC link 204 filters the DC power from the converter 202 and provides energy storage components. The DC link 204 can be composed of capacitors and inductors, which are passive devices that exhibit high reliability rates and very low failure rates. Finally, in the embodiment of FIG. 2A, the inverter 206 converts the DC power from the DC link 204 into variable frequency, variable voltage AC power for the motor 106 and, in the embodiment of FIG. 2B, the inverters 206 are connected in parallel on the DC link 204 and each inverter 206 converts the DC power from the DC link 204 into a variable frequency, variable voltage AC power for a corresponding motor 106. The inverter(s) 206 can be a power module that can include power transistors, insulated gate bipolar transistor (IGBT) power switches and inverse diodes interconnected with wire bond technology. Furthermore, it is to be understood that the DC link 204 and the inverter(s) 206 of the VSD 104 can incorporate different components from those discussed above so long as the DC link 204 and inverter(s) 206 of the VSD 104 can provide the motors 106 with appropriate output voltages and frequencies.

With regard to FIGS. 1B and 2B, the inverters 206 are jointly controlled by a control system such that each inverter 206 provides AC power at the same desired voltage and frequency to corresponding motors based on a common control signal or control instruction provided to the inverters 206. In another embodiment, the inverters 206 are individually controlled by a control system to permit each inverter 206 to provide AC power at different desired voltages and frequencies to corresponding motors 106 based on separate control signals or control instructions provided to each inverter 206. This capability permits the inverters 206 of the VSD 104 to more effectively satisfy motor 106 and system demands and loads independent of the requirements of other motors 106 and systems connected to other inverters 206. For example, one inverter 206 can be providing full power to a motor 106, while another inverter 206 is providing half power to another motor 106. The control of the inverters 206 in either embodiment can be by a control panel or other suitable control device.

For each motor 106 to be powered by the VSD 104, there is a corresponding inverter 206 in the output stage of the VSD 104. The number of motors 106 that can be powered by the VSD 104 is dependent upon the number of inverters 206 that are incorporated into the VSD 104. In one embodiment, there can be either 2 or 3 inverters 206 incorporated in the VSD 104 that are connected in parallel to the DC link 204 and used for powering a corresponding motor 106. While the VSD 104 can have between 2 and 3 inverters 206, it is to be understood that more than 3 inverters 206 can be used so long as the DC link 204 can provide and maintain the appropriate DC voltage to each of the inverters 206.

Figure 3:
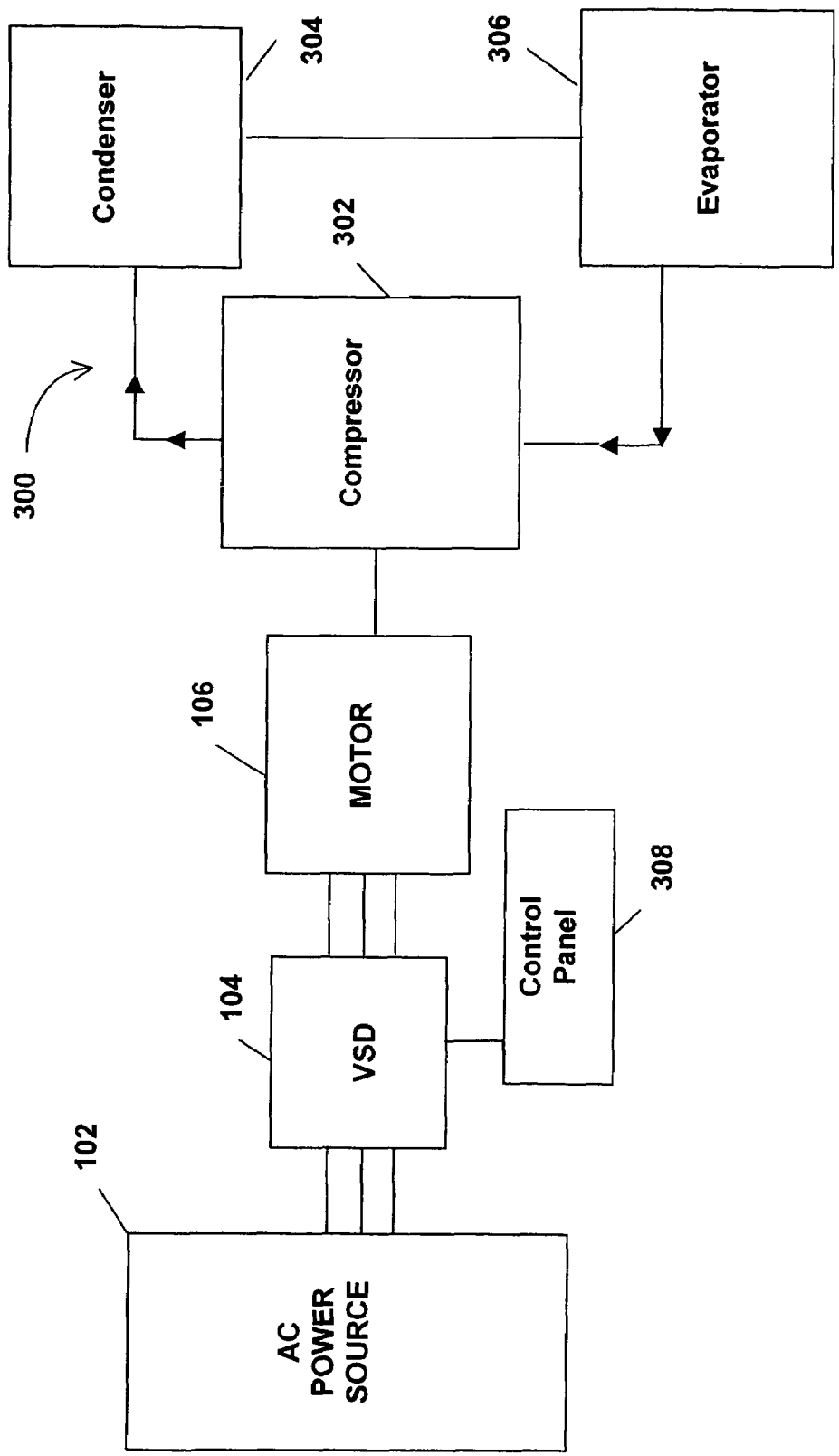
FIG. 3 illustrates schematically a refrigeration system that can be used with the present invention.

FIG. 3 illustrates generally one embodiment of the present invention incorporated in a refrigeration or chiller system using the system configuration and VSD 104 of FIGS. 1A and 2A. As shown in FIG. 3, the HVAC, refrigeration or liquid chiller system 300 includes a compressor 302, a condenser arrangement 304, a liquid chiller or evaporator arrangement 306 and the control panel 308. The compressor 302 is driven by motor 106 that is powered by VSD 104. The VSD 104 receives AC power having a particular fixed line voltage and fixed line frequency from AC power source 102 and provides AC power to the motor 106 at desired voltages and desired frequencies, both of which can be varied to satisfy particular requirements. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104, and the motor 106.

Compressor 302 compresses a refrigerant vapor and delivers the vapor to the condenser 304 through a discharge line. The compressor 302 can be any suitable type of compressor, e.g., screw compressor, centrifugal compressor, reciprocating compressor, scroll compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to the evaporator 306.

The evaporator 306 can include connections for a supply line and a return line of a cooling load. A secondary liquid, e.g., water, ethylene, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD as shown in FIGS. 1B and 2B or multiple VSDs, see generally, embodiment shown in FIGS. 1A and 2A, connected into each of one or more refrigerant circuits.

Figure 4A:
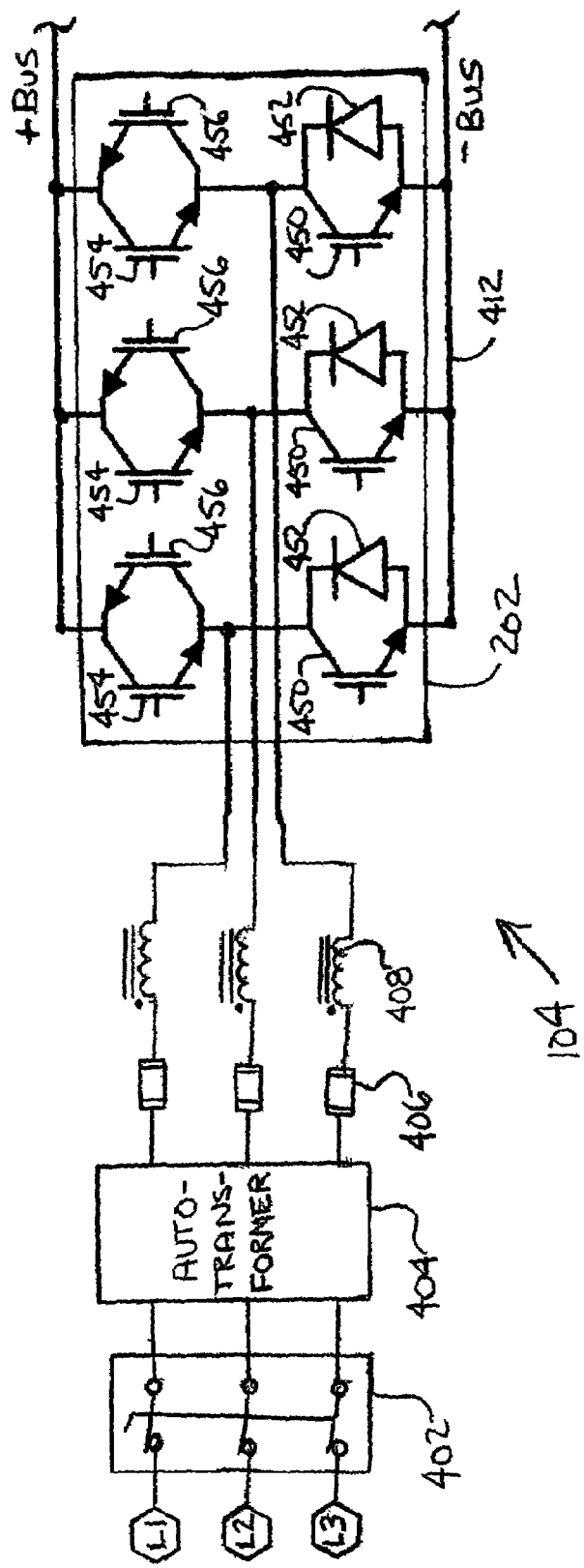
FIGS. 4A and 4B illustrate a circuit diagram of an embodiment of the variable speed drive of the present invention.
Figure 4B:
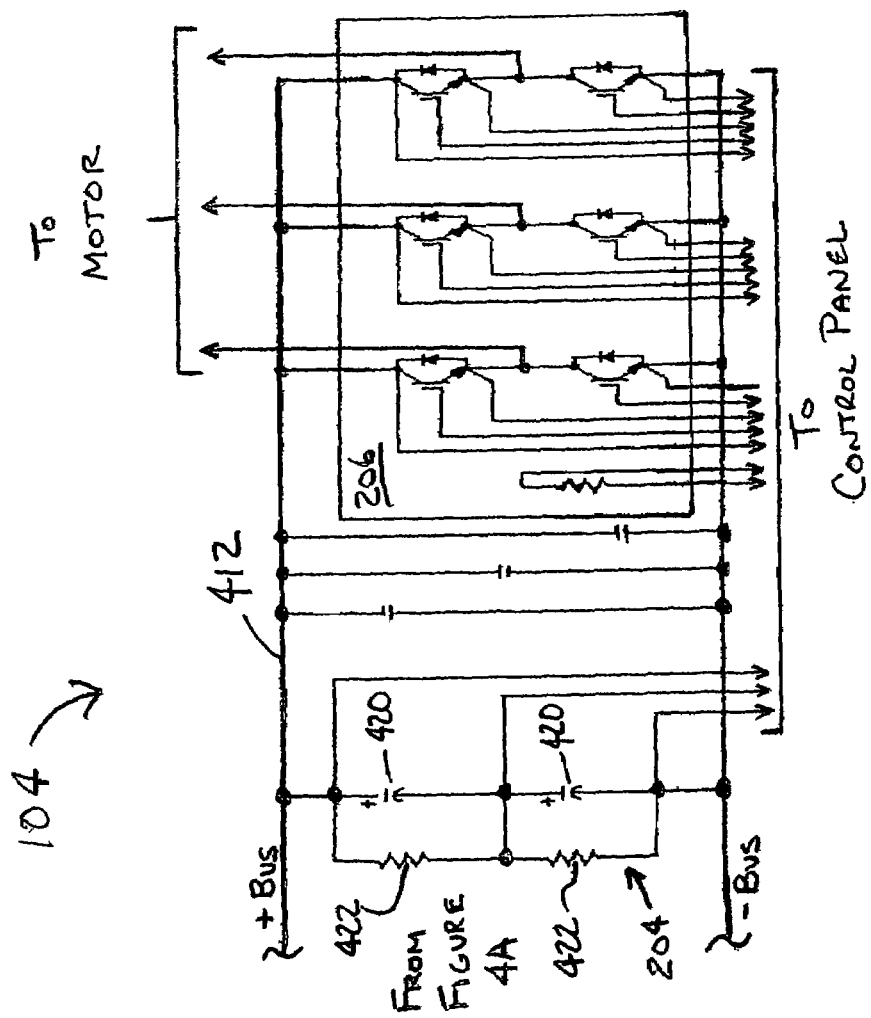

FIGS. 4A and 4B show a circuit diagram for one embodiment of the VSD 104, as shown in FIG. 2A. In this embodiment of the VSD 104, the input lines L1–L3 from the three-phase AC power source 102 are connected to a circuit breaker 402, which circuit breaker 402 can disconnect the VSD 104 from the AC power source 102 when an excess current, voltage or power is provided to the VSD 104. The circuit breaker 402 can then be connected to an optional autotransformer 404. The autotransformer 404, when used, is preferably used to adjust an input voltage (either up or down) from the AC power source 102 to a desired input voltage. Fuses 406 for each line can be used to disconnect that input phase or line of the VSD 104 in response to an excessive current in that line. Inductors 408 for each line are used to smooth the current in the corresponding line of the VSD 104. The output of each of the inductors 408 is then provided to the converter 202 to convert each phase of the input AC power to DC power.

Connected in parallel to the outputs of the converter 202 is the DC link 204. The DC link 204 in this embodiment includes capacitors 420 and resistors 422 to filter the DC power and store energy from the DC bus 412. The resistors 422 can function as voltage balancing devices to maintain a substantially equal DC link voltage between capacitor banks 420. The resistors 422 can also function as charge depleting devices to "bleed off" stored voltage in the capacitor banks 420 when the power is removed from the AC power source 102. Also connected to the DC bus 412 is an inverter section 206, which converts the DC power on the DC bus 412 to three phase AC power for a motor. In the embodiment shown in FIGS. 4A and 4B, one inverter section or module 206 is used. However, additional inverter modules 206, as shown in FIG. 2B, can be added and would have a similar circuit representation to the inverter module 206 shown in FIG. 4B. The inverter module 206 includes three pairs (one for each output phase) of IGBT power switches and inverse diodes. The inverter modules 206 also include the corresponding control connections to control the switching of the IGBT power switches.

The inverter module 206 converts the DC power on the DC bus 412 to three phase AC power by selectively switching each of the IGBT power switches in the inverter module 206 between an "on" or activated position and an "off" or deactivated position using a modulation scheme to obtain the desired AC voltage and frequency from the inverter module 206. A gating signal or switching signal is provided to the IGBT power switches by the control panel 308, based on the modulation scheme, to switch the IGBT power switches between the "on" position and the "off" position. The IGBT power switches are preferably in the "on" position when the switching signal is "High," i.e., a logical one, and in the "off" position when the switching signal is "Low," i.e., a logical zero. However, it is to be understood that the activation and deactivation of the IGBT power switches can be based on the opposite state of the switching signal.

In a preferred embodiment of the present invention, the precharge of the capacitors 420 of the DC link 204 is controlled using the converter module 202 shown in FIG. 4A. The converter module 202 includes three pairs (one pair for each input phase) of power switches or transistors. The converter module 202 also includes the corresponding control connections (not shown for simplicity) to control the switching of the power switches in a manner similar to that described above for the inverter module 206. In a preferred embodiment of the converter module 202, the power switches are IGBT power switches, as discussed in detail below, that are controlled by a pulse width modulation technique to generate the desired output voltages for the DC link. Preferably, the converter module 202 can operate as a boost rectifier to provide a boosted DC voltage to the DC link 204 to obtain an output voltage from the VSD 104 greater than the input voltage of the VSD 104.

In the converter module 202, one of the power switches in each pair of power switches is an IGBT 450 connected to an inverse or anti-parallel diode 452. The inverse or anti-parallel diode 452 is used to conduct current after the other power switch, IGBT 454, is turned off when the VSD 104 is operated in a pulse width modulation mode. As shown in FIG. 4A, the IGBTs 450 and inverse diodes 452 are connected between the output of the inductors 408 and the negative rail of the DC bus 412. However, in another embodiment of the present invention, the IGBTs 450 and inverse diodes 452 can be connected between the output of the inductors 408 and the positive rail of the DC bus 412.

The other power switch in the pair of power switches is a reverse blocking IGBT 454, i.e., the IGBT 454 is capable of blocking voltages in the reverse as well as the forward direction. The reverse blocking IGBT 454 is connected to an inverse or anti-parallel IGBT 456, which anti-parallel IGBT 456 is also a reverse blocking IGBT. The anti-parallel IGBT 456 is then preferably controlled during the precharge operation to permit only small pulses of inrush current to reach the DC link. After the precharge operation is completed, the anti-parallel IGBT 456 can be controlled to conduct at all times, similar to the anti-parallel diode 452. In another embodiment of the present invention, other reverse blocking power switches, such as an IGBT power switch, e.g., IGBT 450, connected in series with a diode that can provide reverse blocking, can be used instead of reverse blocking IGBTs 454. In still another embodiment of the present invention, IGBTs 450 can be replaced by reverse blocking IGBTs 454.

The reverse blocking IGBT 454 blocks a positive emitter-to-collector voltage that is approximately equal to the peak line-to-line voltage that appears across the IGBT 454 for as long as the conduction of the anti-parallel IGBT 456 is delayed for the purpose of precharge. In addition, the reverse blocking capabilities of the reverse blocking IGBT 454 and the anti-parallel IGBT 456 provide good reverse recovery characteristics when operated as conventional diodes. The reverse recovery characteristics of the anti-parallel IGBT 456 prevent significant reverse recovery losses from occurring in the anti-parallel IGBT 456 by preventing a significant reverse current from flowing in the anti-parallel IGBT 456 whenever the series connected IGBT 450 in the same phase turns on. Furthermore, the preventing of the reverse current in the anti-parallel IGBT 456 can limit the peak current value, and the corresponding losses, in the series connected IGBT 450 when series connected IGBT 450 is turned on. As shown in FIG. 4A, the reverse blocking IGBT 454 and anti-parallel IGBT 456 are connected between the output of the inductors 408 and the positive rail of the DC bus 412. However, in another embodiment of the present invention, the reverse blocking IGBT 454 and anti-parallel IGBT 456 can be connected between the output of the inductors 408 and the negative rail of the DC bus 412.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A variable speed drive comprising:
   an inverter module to convert a DC voltage to an AC voltage to power a motor;
   a DC link to filter and store energy, the DC link being electrically connected in parallel to the inverter module;
   a converter module to convert an AC voltage to a DC voltage, the converter module being electrically connected in parallel to the DC link and being electrically connected to an AC power source, the converter module comprising a plurality of pairs of power switches, wherein each pair of power switches includes an insulated gate bipolar transistor connected to an anti-parallel diode and a reverse blocking insulated gate bipolar transistor connected to an anti-parallel reverse blocking insulated gate bipolar transistor; and
   wherein the plurality of pairs of power switches in the converter module are controllable to precharge the DC link.

* * * * *